United States Patent Office.

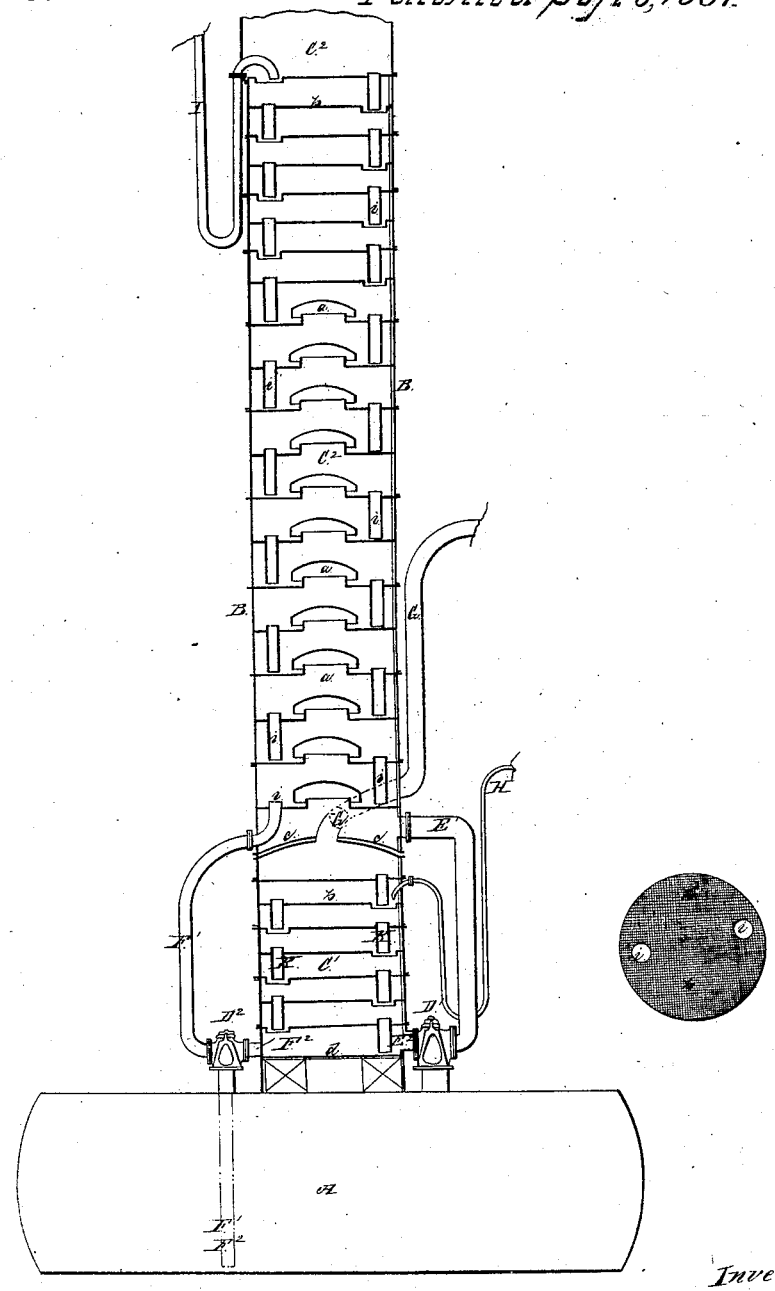

GUSTAVE BEQUET, SON, OF NEW YORK, N. Y., ASSIGNOR TO HIMSELF AND MORITZ PINNER, OF SAME PLACE.

*Letters Patent No. 68,409, dated September 3, 1867.*

IMPROVED APPARATUS FOR RECTIFYING AND DISTILLING.

The Schedule referred to in these Letters Patent and making part of the same.

Be it known that I, GUSTAVE BEQUET, SON, of the city of New York, in the county and State of New York, have invented "a New and Improved Rectifying and Distilling Apparatus;" and I do hereby declare that the following is a full, clear, and exact description of the construction and operation of the same, reference being had to the accompanying drawings, which form a part of this specification, and to the letters of reference marked thereon.

A, in the accompanying drawings, denotes a still or boiler; B denotes a perpendicular section of a column; $C^1$ denotes the lower part of that column, $C^2$ denotes the upper part; $D^1$ and $D^2$ denote three-way stop-cocks; E denotes a pipe, with turns or branches $E^1$, $E^2$, $E^3$; $F^1$ denotes a return pipe, with a branch, $F^2$; G denotes a pipe for conducting the contents of column-part $C^1$ into condensers, etc.; H denotes a siphon, attached with its upper end to a condenser or cooler, and with its lower end to column-part $C^1$; I denotes a siphon, attached with its upper end to a condenser or cooler, and with its lower end to column-part $C^2$; $a$ denotes sections, as ordinarily constructed, within the interior of a column; $b$ denotes sections consisting of perforated plates, as sometimes used instead of those at $a$; $c$ denotes a cap or plate for separating the column-part $C^1$ from the column-part $C^2$; $d$ denotes a plate that separates the column B from the still A; $i$ and $k$ denote passages within the interior of the column B.

The object of my invention is a twofold one, to wit: first, the construction of an apparatus that could, by turns, be used for distilling as well as rectifying, and that would perform to perfection both of these operations; second, the construction of a column that has within itself a sufficient number of isolated chambers for the reception and separate treatment of alcoholic or other vapors coming from one and the same still; and to enable others skilled in the art to make and use my invention, I will now proceed to describe the construction and operations of my improved apparatus, beginning with the construction, which is as follows:

I construct my still and column in any known or desirable manner, and divide the interior of my column into sections, by perforated plates, or otherwise, as may seem desirable. But instead of having all such sections uninterruptedly connected with each other, I divide them into several series or sets of sections, by placing a tight dividing-plate between any two sections, and at any desirable distance from the bottom of the column. In my drawings such a dividing-plate is represented by the cap $c$, and by putting in that cap $c$ the interior of the column part $C^1$ is entirely shut off from the interior of the column part $C^2$. Into the centre of that cap $c$ I insert a pipe, G, and conduct the latter close above that cap $c$, through the side of the column, or, at option, I insert that pipe G into the side of the column immediately below that cap $c$, and the upper end of that pipe G is then attached to condensers, coolers, or worms, that may be provided for the reception and treatment of the low wines, or other contents of the column-part $C^1$, which is below that cap $c$. In like manner do I insert pipe E into the side of my column, in such a way that its upper end, $E^1$, enters the column immediately above the cap $c$, while its lower end, $E^2$, enters the column close above the base of the latter, (and indicated as plate $d$,) and a branch of that pipe, $E^3$, enters the still A. The pipe end $E^2$ is provided with a two or three-way stop-cock, $D^1$, by means of which I can turn the contents of the still A, at option, either into the column-part $C^1$ or into the column-part $C^2$, and by the use of that stop-cock $D^1$ I save an additional conducting pipe from the still A into every particular column-part. I also insert into the side of the column the pipes or siphons H and I, attaching their upper ends to condensers, and I use these siphons as return pipes for returning through them, and through the column-parts to which they are respectively attached into the still A, such substances as require re-rectification or re-distillation. The pipe $F^1$ simply serves as a continuation of the siphon I, and the pipe end $F^2$ as a continuation of the siphon H. Both these continuations lead through three-way stop-cock $D^2$ into the still A. Other parts of my apparatus need not differ from those already known or generally in use.

The operations of my apparatus are as follows:

First, for distilling. I charge the still A with mash, or other articles to be distilled, open the stock-cock $D^1$, so as to enable the vapors developing in the still A to pass from that still through branch pipe $E^3$, stop-cock $D^1$, and pipes E and $E^1$ into column-part $C^2$, and from this again through a pipe (attached to the head of the column-part $C^2$, like pipe G at the head of column-part $C^1$,) into the worm, cooler, or condenser, supposed to be connected therewith. The condensed water, oil, or other undesirable substances, are then allowed to return from the condenser into the still A, through siphon I, passages (in the interior of column-part $C^2$,) pipe $F^1$, stop-cock $D^2$, and branch pipe $F^1$. From the still A these returned substances are then discharged or utilized, as in ordinary distilling operations. Instead of turning the vapors from the still A into the column-part $C^2$, I could, for distilling purposes, turn them, as a matter of course, just as well into column-part $C^1$, for, to do this, I would only have to turn the three-way p-cock $D^1$ in such a way as to open a passage from the still A through branch pipe $E^3$, stop-cock $D^1$, and branch pipe $E^2$, into that column-part $C^1$, instead of opening the previously-described passage into column-part $C^2$. All the other operations connected with distilling on my apparatus are, or can be, the same as those connected with distilling in a French column, as ordinarily done.

Second, for rectifying. I charge the still A with whiskey, or other desirable liquids, turn the stop-cock $D^1$ so as to open (for the ethers, oils, or other impurities that first develop in the heated still A,) a passage through pipe-branch $E^3$, stop-cock $D^1$, and branch pipe $E^2$, into column-part $C^1$, where they may be treated by Jean Gustave Bequet's or any other desirable process before they rise through pipe G into the condenser or cooler supposed to be attached thereto. From such condenser or cooler the less volatile or less desirable parts or impurities are allowed to return into still A for re-rectification, utilization, or discharge, and on their way to the still A they pass through siphon H, column-part $C^1$, passages $k$, branch pipe $F^2$, stop-cock $D^2$, and the lower end of pipe $F^1$. As soon as these first vapors, these ethers, oils, low wines, or other impure or less desirable materials have all passed through the column-part $C^1$, or, in other words, as soon as the test pipe (which is supposed to be attached to this, as to every other apparatus,) shows that the high wines, or other articles to be rectified, have begun to flow, then I turn the stop-cock $D^1$ once more, but this time in such a manner that, while I shut the passage from the still A into column-part $C^1$, just described, I open at the same time a passage from that still A into the column-part $C^2$ through branch pipe $E^3$, stop-cock $D^1$, and pipes E and $E^1$. In that column-part $C^2$ the contents, i. e., the high wines or other vapors are also treated by Jean Gustave Bequet's or any other known or desirable process, and thence they rise through a pipe or neck (like G) into condensers or coolers, supposed to be connected with the column-part $C^2$, and supposed to be separate from the condenser or cooler used for the contents of the column-part $C^1$. The less volatile or more impure substances first condensed in the condenser connected with the column-part $C^2$ are allowed to return into the still A for re-rectification or discharge, and on their way to the still they pass through siphon I, passages $i$, (in column-part $C^2$,) pipe $F^1$, stop-cock $D^2$, and branch pipe $F^1$. The condensed high wines, or other (more or less pure) substances, are thence discharged from the condensers as in the ordinary manner, and irrespective of this invention.

It will readily be seen that an apparatus like the one just described has the advantage of great simplicity of construction, and that it is easily operated without any previously acquired great knowledge of the rectifying business. It also causes a saving of space and fuel, as compared with all other rectifying apparatus, for the space it has to occupy need to be but small, and the heat of the contents of the column-part $C^1$ keeps the cap $c$, and with it the interior of the column-part $C^2$, tolerably hot, thus not only saving in fuel, but also expediting the process of rectifying in that column-part $C^2$.

No particular process is necessarily required in my apparatus for the treatment of the vapors in the column B, or any of its parts, nor do the operations of my apparatus depend upon any particular construction of worms, coolers, or condensers, though, in practice, I find it advantageous to employ both the process and the condenser of Jean Gustave Bequet.

In like manner do the operations of my apparatus not depend upon any particular construction of the sections within the column, though, in practice, I find it advantageous to use partly cap-sections like $a$ and partly perforated plates like $b$.

It will also readily be perceived that I can easily change the number, shape, and placing of parts of my apparatus, without materially affecting the principal features and operations of my invention, and I therefore do not confine myself to the precise construction herein described. Stills, columns, pipes, stop-cocks, worms, coolers, or condensers might be multiplied, other suitable parts might be added, the capacity of such an apparatus might thereby be increased or changed, and yet, in all these modifications, the principal feature of my invention could be retained, i. e., in one and the same column separate chambers, in any desirable number, could be provided for the different articles that are to be treated in them or passed through them from one or more stills.

I therefore claim as my invention, and desire to secure by Letters Patent—

1. An apparatus adapted to make rum, whiskey, alcohol, French spirits, and kindred articles, when constructed substantially as described.

2. Constructing a rectifying or distilling column in such a way as to enable the passing through different channels or chambers, within the same column, of articles or vapors of different quality or degree, all substantially as described and for the purposes set forth.

3. Dividing the interior of a rectifying or distilling column into parts, in such a manner that either part could be used for a specific purpose, without interfering with the functions or operations of the other part or parts, all substantially as herein described.

4. Using within the interior of one and the same rectifying or distilling column, sections, divisions, or passages of a variety of constructions, substantially as herein set forth.

5. Using the cap $c$, the stop-cocks $D^1$ and $D^2$, the passages $E^1$ and $E^2$, the pipes $F^1$ $F^2$ G H I, the passages $i$ and $k$, or either of these parts, in combination with a rectifying or distilling column, when the latter is divided into compartments, substantially as herein described.

GUSTAVE BEQUET, SON.

Witnesses:
LEWIS HURST,
PETER SMITH.